US009020147B2

(12) United States Patent
Kawamura et al.

(10) Patent No.: US 9,020,147 B2
(45) Date of Patent: Apr. 28, 2015

(54) ELECTRONIC KEY REGISTRATION METHOD, ELECTRONIC KEY REGISTRATION SYSTEM, AND CONTROLLER

(71) Applicant: Kabushiki Kaisha Tokai Rika Denki Seisakusho, Aichi (JP)

(72) Inventors: Daisuke Kawamura, Aichi (JP); Yuki Nawa, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 68 days.

(21) Appl. No.: 14/058,710

(22) Filed: Oct. 21, 2013

(65) Prior Publication Data

US 2014/0126719 A1    May 8, 2014

(30) Foreign Application Priority Data

Nov. 2, 2012   (JP) ................................. 2012-242709

(51) Int. Cl.
    *H04L 29/06*     (2006.01)
    *H04L 9/08*      (2006.01)
    (Continued)

(52) U.S. Cl.
    CPC ................ *H04L 9/0816* (2013.01); *H04L 9/08* (2013.01); *H04L 9/06* (2013.01); *G07C 9/00571* (2013.01); *G07C 9/00857* (2013.01); *G07C 2009/00412* (2013.01)

(58) Field of Classification Search
    CPC ............... H04L 9/06; H04L 9/08; H04L 9/18; H04L 9/22; H04L 9/30; H04L 9/0861
    USPC ....................................................... 380/440
    See application file for complete search history.

(56) References Cited

U.S. PATENT DOCUMENTS 5,940,002 A *  8/1999  Finn et al. ..................... 340/5.26
8,357,018 B2 *  1/2013  Takeda et al. ..................... 440/1
(Continued)

FOREIGN PATENT DOCUMENTS

JP       2011-020475       2/2011

OTHER PUBLICATIONS

U.S. Appl. No. 14/044,347 to Daisuke Kawamura et al., filed Oct. 2, 2013.

(Continued)

*Primary Examiner* — Hadi Armouche
*Assistant Examiner* — Shahriar Zarrineh
(74) *Attorney, Agent, or Firm* — Greenblum & Bernstein, P.L.C.

(57) ABSTRACT

A method for registering first and second electronic keys to a controller of a communication subject through communication with a data center includes acquiring first and second key identification information from the first and second electronic keys with the controller, transmitting communication subject identification information together with both of the first and second key identification information from the controller to the data center, acquiring a first encryption key generation code corresponding to the first electronic key together with a second encryption key generation code corresponding to the second electronic key from the data center with the controller, generating a first key encryption key based on the first encryption key generation code with the controller, generating a second key encryption key based on the second encryption key generation code with the controller, and storing the first and second key encryption keys in the controller.

5 Claims, 4 Drawing Sheets

(51) Int. Cl.
*G07C 9/00* (2006.01)
*H04L 9/06* (2006.01)

(56) References Cited

U.S. PATENT DOCUMENTS

| | | | |
|---|---|---|---|
| 2004/0093127 A1* | 5/2004 | Onoyama et al. | 701/1 |
| 2005/0023902 A1* | 2/2005 | Maeda | 307/10.5 |
| 2005/0247280 A1* | 11/2005 | Asada et al. | 123/179.3 |
| 2007/0200671 A1* | 8/2007 | Kelley et al. | 340/5.72 |
| 2008/0059806 A1* | 3/2008 | Kishida et al. | 713/186 |
| 2008/0204192 A1* | 8/2008 | Hamamura | 340/5.72 |
| 2013/0179003 A1* | 7/2013 | Doi et al. | 701/1 |
| 2013/0285792 A1 | 10/2013 | Shimizu et al. | |
| 2013/0301829 A1 | 11/2013 | Kawamura et al. | |
| 2013/0301834 A1 | 11/2013 | Kawamura et al. | |
| 2013/0329890 A1 | 12/2013 | Kawamura et al. | |
| 2013/0332736 A1 | 12/2013 | Kawamura et al. | |

OTHER PUBLICATIONS

U.S. Appl. No. 14/043,081 to Daisuke Kawamura et al., filed Oct. 1, 2013.

* cited by examiner

ELECTRONIC KEY REGISTRATION METHOD, ELECTRONIC KEY REGISTRATION SYSTEM, AND CONTROLLER

CROSS-REFERENCE TO RELATED APPLICATIONS

This application is based upon and claims the benefit of priority from prior Japanese Patent Application No. 2012-242709, filed on Nov. 2, 2012, the entire contents of which are incorporated herein by reference.

FIELD

The present invention relates to a method and system for registering an electronic key to a controller of a communication subject, and a controller.

BACKGROUND

An electronic key system verifies an electronic key by performing wireless communication with an electronic key. When the electronic key is verified, the locking and unlocking of vehicle doors and the starting of the engine is performed. In such an electronic key system, encrypted communication is performed between the electronic key and the vehicle to maintain a certain level of security. This allows for the electronic key to be verified with a high level of confidentiality.

The common key cryptosystem is one type of an encryption standard. In an electronic key system that uses the common key cryptosystem, when registering an electronic key to a controller of a vehicle, the electronic key and the vehicle both store the same encryption key. The controller uses the encryption key to communicate with and verify the electronic key by comparing identification information that is transmitted from the electronic key with identification information that is stored in the controller.

Japanese Laid-Open Patent Publication No. 2011-20475 describes an electronic key registration system that registers an electronic key to a controller by storing an encryption key in the controller and the electronic key. In the electronic key registration system, a data center communicates with the electronic key and the controller to store an encryption key in the electronic key and the controller and associate the electronic key with the controller. This prevents an unauthorized electronic key from being registered to the controller.

When registering a plurality of electronic keys in the electronic key registration system of the prior art, the electronic keys are required to be registered one by one. Thus, whenever an electronic key is registered, communication is performed between the data center and the electronic key and between the data center and the controller. That is, communication with the data center is repeated for a number of times that is the same as the number of electronic keys that are to be registered. Accordingly, the registration of electronic keys is burdensome. This problem occurs not only when the electronic key system is applied to a vehicle but also when applied to a building such as a house.

SUMMARY

A first aspect of the present invention is an electronic key registration method for registering a plurality of electronic keys to a controller of a communication subject through communication with a data center. The electronic keys are capable of communicating with the controller. The electronic key registration method includes storing communication subject identification information and a communication subject encryption key in the controller. The communication subject identification information and the communication subject encryption key are unique to the communication subject. Further, the method includes storing the communication subject identification information and the communication subject encryption key in the data center, and storing first key identification information and a first key encryption key in the first electronic key. The first key identification information and the first key encryption key are unique to a first electronic key. The method also includes storing second key identification information and a second key encryption key in the second electronic key. The second key identification information and a second key encryption key are unique to the second electronic key. Further, the method includes storing the first and second key identification information and the first and second key encryption keys in the data center, acquiring the first key identification information from the first electronic key with the controller, acquiring the second key identification information from the second electronic key with the controller, transmitting the communication subject identification information together with the first and second key identification information from the controller to the data center, and generating a first encryption key generation code with the data center. The first encryption key generation code is based on the communication subject encryption key and the first key encryption key. Additionally, the method includes generating a second encryption key generation code with the data center. The second encryption key generation code is based on the communication subject encryption key and the second key encryption key. Further, the method includes obtaining the first and second encryption key generation codes together from the data center with the controller, generating the first key encryption key based on the first encryption key generation code with the controller, generating the second key encryption key based on the second encryption key generation code with the controller, and storing the first and second key encryption keys in the controller.

A second aspect of the present invention is an electronic key registration system provided with a plurality of electronic keys including first and second electronic keys, a controller arranged in a communication subject and capable of communicating with the electronic keys, and a data center. The controller includes a memory that stores commands executed by the controller. The commands include commands configured to have the controller acquire first key identification information from the first electronic key, acquire second key identification information from the second electronic key, transmit communication subject identification information together with the first and second key identification information to the data center, acquire a first encryption key generation code corresponding to the first electronic key together with a second encryption key generation code corresponding to the second electronic key from the data center, generate a first key encryption key based on the first encryption key generation code, and generate a second key encryption key based on the second encryption key generation code.

A third aspect of the present invention is a controller arranged in a communication subject. The controller is capable of communicating with a data center and a plurality of electronic keys including first and second electronic keys. The controller includes a memory that stores commands executed by the controller. The commands include commands configured to have the controller acquire first key identification information from the first electronic key, acquire second key identification information from the second electronic key, transmit communication subject identification information together with the first and second key identification information to the data center, acquire a first encryption key generation code corresponding to the first electronic key together with a second encryption key generation code corresponding to the second electronic key from the data center, generate a first key encryption key based on the first encryption key generation code, and generate a second key encryption key based on the second encryption key generation code.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of an electronic key registration system applied to, for example, a vehicle will now be described with reference to FIGS. 1 to 4.

Figure 1:
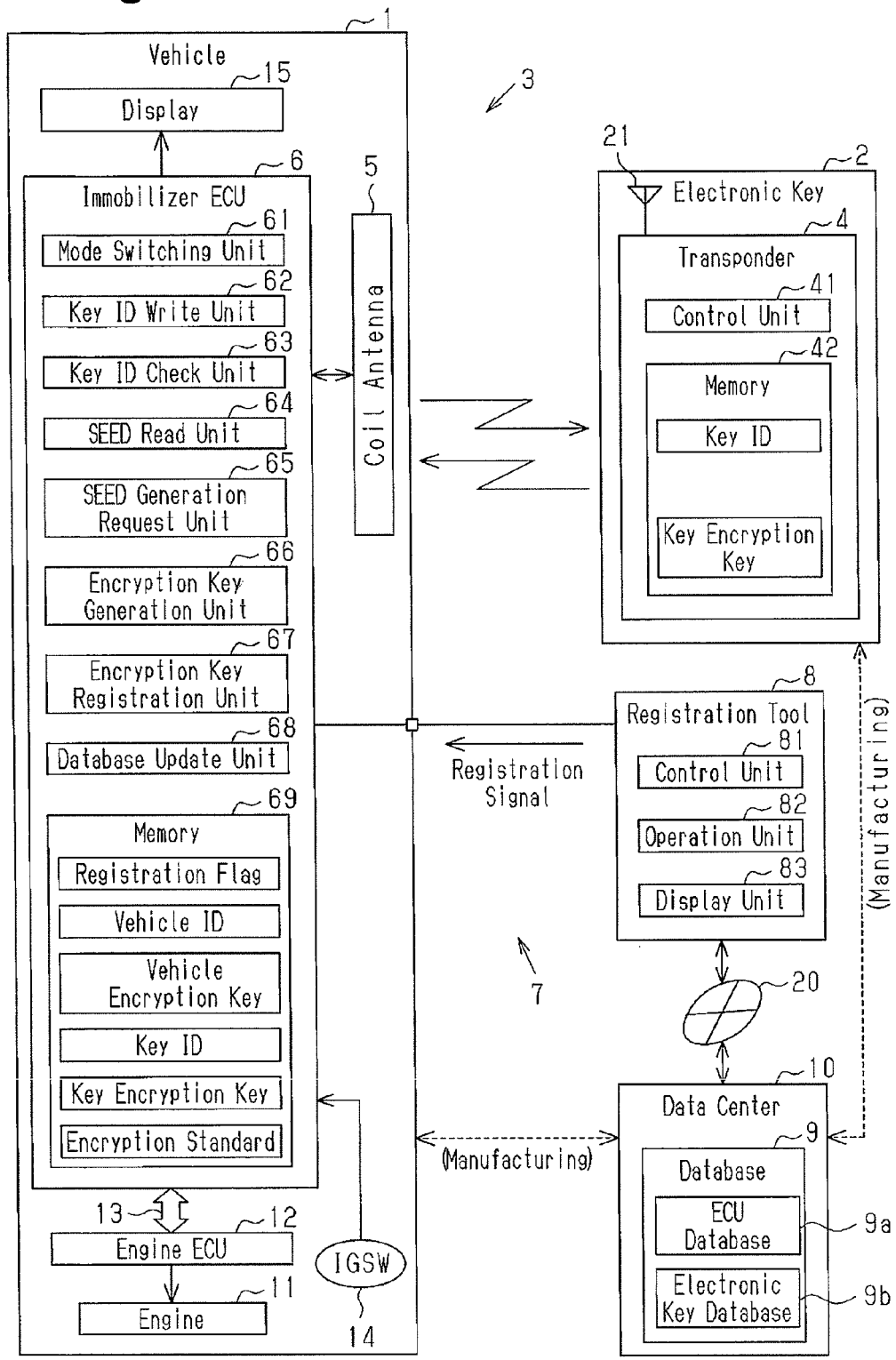
FIG. 1 is a schematic block diagram of an electronic key registration system.

Referring to FIG. 1, the vehicle 1 includes an immobilizer system 3 that performs ID verification on an electronic key 2 through, for example, near-field communication. The communication distance for near-distance communication is several centimeters. The electronic key 2 includes a transponder 4 that serves as an ID tag. The transponder 4 is activated by drive radio waves transmitted from a coil antenna 5 of the vehicle 1. The ID verification of the electronic key 2 is performed based on a key ID signal transmitted from the transponder 4. In the present embodiment, the vehicle 1 corresponds to a communication subject, and the immobilizer system 3 is one example of an electronic key system.

The vehicle 1 includes an immobilizer ECU 6 that serves as a controller. An in-vehicle LAN 13 connects the immobilizer ECU 6 to an engine ECU 12 that controls the operation of an engine 11. The immobilizer ECU 6 includes a memory 69 that stores an ID code of the electronic key 2. Further, the immobilizer ECU 6 is connected to the coil antenna 5, which is arranged in a key cylinder. The coil antenna 5 receives and transmits radio waves on a low frequency (LF) band or a high frequency (HF) band. A magnetic field antenna is used as the coil antenna 5. The immobilizer ECU 6 is one example of a controller.

The transponder 4 includes a control unit 41 that controls communication of the transponder 4. The control unit 41 includes a memory 42 that stores a key ID code (key identification information) unique to the electronic key 2. In the present embodiment, the key ID code is a transponder code. The transponder 4 is connected to an antenna 21 that transmits and receives radio waves on an LF band or an HF band in the same manner as the coil antenna 5.

The immobilizer ECU 6 intermittently transmits radio waves from the coil antenna when, for example, the electronic key 2 is inserted into the key cylinder. For example, when the key cylinder is inserted into the key cylinder and the engine 11 is started, the transponder 4 receives radio waves transmitted from the coil antenna 5 with the antenna 21. The transponder 4, which is activated by the radio waves, transmits a key ID signal, which includes the key ID code stored in the memory 42, from the antenna 21. The immobilizer ECU 6, which receives the key ID signal with the coil antenna 5, performs ID verification (immobilizer verification) on the electronic key 2. When the ID verification of the electronic key 2 is accomplished, the immobilizer ECU 6 stores information indicating that ID verification has been accomplished in the memory 69.

The key cylinder includes an ignition switch (IGSW) that detects the rotational position of the electronic key 2. For example, when the ignition switch 14 is rotated to an engine start position together with the electronic key 2, the engine ECU 12 communicates with the immobilizer ECU 6 to check whether or not ID verification of the electronic key 2 has been accomplished. When the engine ECU 12 receives information indicating ID verification accomplishment from the immobilizer ECU 6, the engine ECU 12 starts the execution of an ignition control and a fuel injection control on the engine 11.

In the immobilizer verification, challenge-response verification is performed in addition to the ID verification of the electronic key 2. In the challenge-response verification, the immobilizer ECU 6 transmits a challenge code (e.g., random number code) to the electronic key 2. The electronic key 2 computes a response code from the challenge code and returns the response code to the vehicle 1. In the same manner, the immobilizer ECU 6 computes a response code and determines whether or not the response code conforms to the response code acquired from the electronic key 2. The wireless communication performed between the immobilizer ECU 6 and the transponder 4 is based on the common key cryptosystem, which stores the same encryption key in the electronic key 2 and the immobilizer ECU 6. The electronic key 2 and the immobilizer ECU 6 each use the encryption key to compute the response code from the challenge code.

The memory 42 of the transponder 4 stores a key ID code KID (key identification information) and a key encryption key K. The key encryption key K is unique to the electronic key 2 and associated with the key ID code KID. The key encryption key K is used to verify the electronic key 2.

The memory 69 of the immobilizer ECU 6 includes a registration flag set to indicate whether or not to permit registration of the electronic key 2 to the immobilizer ECU 6. Further, the memory 69 of the immobilizer ECU 6 stores a vehicle ID code VID (communication subject identification information), which is unique to the vehicle 1, a vehicle encryption key VK (communication subject encryption key), the key encryption key K, and an encryption standard AES (encryption program). The vehicle encryption key VK is unique to the vehicle 1 and associated with the vehicle ID code VID. The key encryption key K conforms to that stored in the memory 42 of the transponder 4 and is used to verify the electronic key 2. The key encryption key K stored in the memory 69 of the immobilizer ECU 6 is generated by the immobilizer ECU 6 when the electronic key 2 is registered. The vehicle encryption key VK and the encryption standard AES are used for registration of the electronic key 2 (generation of the key encryption key K).

An electronic key registration system 7 registers the electronic key 2 that is used in the immobilizer system 3. The electronic key registration system 7 is used to, for example, register a new electronic key 2 to the immobilizer ECU 6 or reregister the electronic key to an exchanged immobilizer ECU 6.

Figure 2:
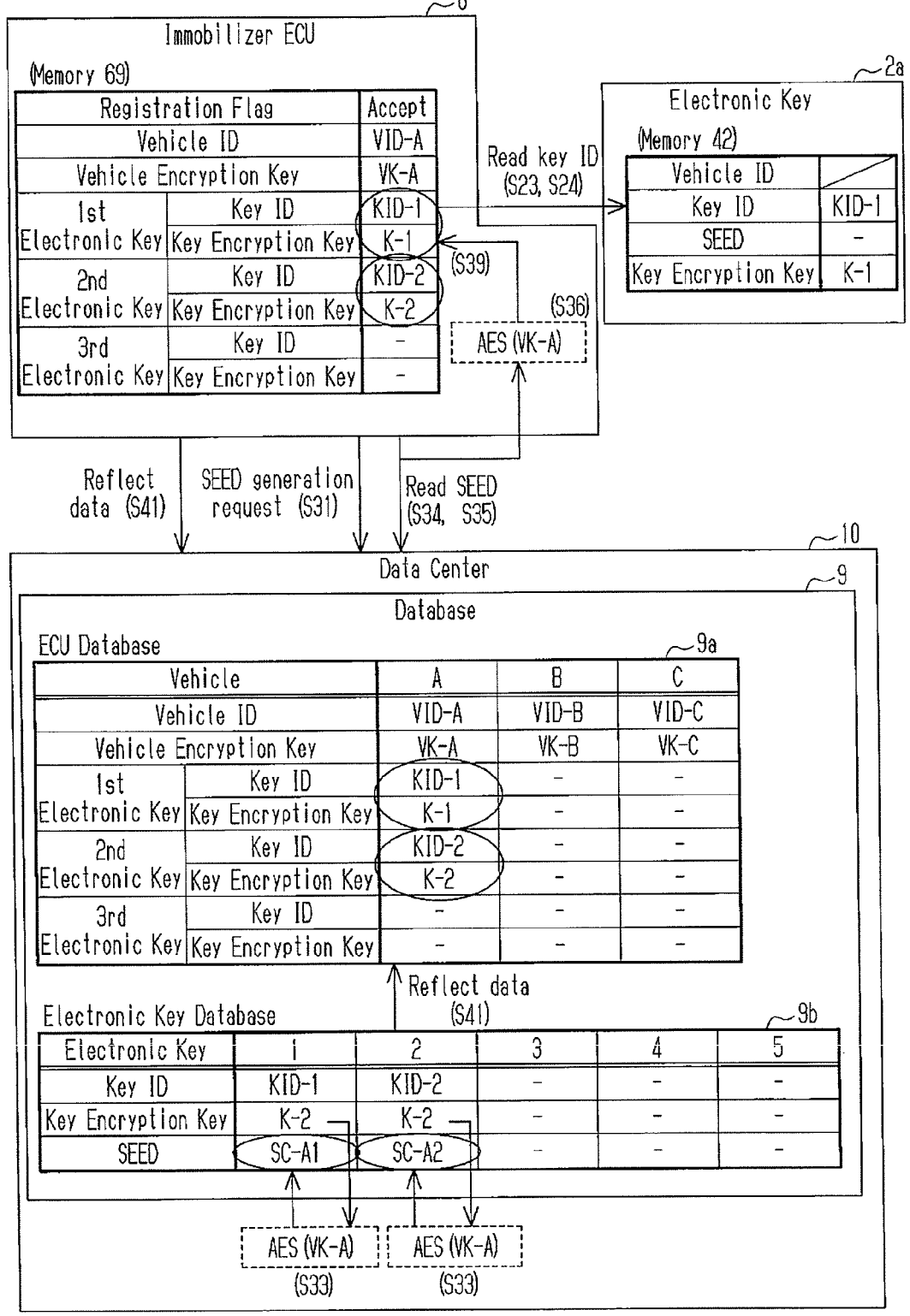
FIG. 2 is a schematic block diagram illustrating an electronic key registration process in the electronic key registration system of FIG. 1.

As illustrated in FIG. 1, the electronic key registration system 7 includes a registration tool 8 and a data center 10. As illustrated in FIG. 2, the data center 10 includes a database 9. The database 9 includes an ECU database 9a, which stores data of the immobilizer ECU 6, and an electronic key database 9b, which stores data of the electronic key 2. The electronic key database 9b stores the key ID code KID and the encryption key K of each electronic key 2. The ECU database 9a stores the vehicle ID code VID and the vehicle encryption key VK of each vehicle 1 and the key ID code KID and the key encryption key K of each electronic key 2. The key ID code KID and the key encryption code K are stored to the ECU database 9a when the electronic key 2 is registered. The database 9 also stores the encryption standard AES (encryption program). The data center 10 uses the encryption standard AES to generate a SEED code SC (encryption key generation code). The immobilizer ECU 6 uses the SEED code SC to generate the key encryption key K.

In the electronic key registration system 7, when the key ID code KID and the key encryption key K are both stored in the memory 69 of the immobilizer ECU 6, the electronic key 2 is registered to the immobilizer ECU 6. The immobilizer ECU 6 does not directly acquire the key encryption key K from the data center 10 or the electronic key 2. Rather, the immobilizer ECU 6 acquires the SEED code SC from the data center 10 and uses the SEED code SC to generate the key encryption key K. The SEED code differs for each electronic key 2 and for each vehicle 1. In the present embodiment, the data center 10 uses the encryption standard AES, the key encryption key K, and the vehicle encryption key VK to generate the SEED code SC.

The registration tool 8 is communicatively connected to the immobilizer ECU 6 of the vehicle 1 when registering the electronic key 2. The registration of the electronic key 2 is performed by switching the operation mode of the immobilizer ECU 6 to a registration mode. The registration tool 8 includes a control unit 81, an operation unit 82 operated by a user, and a display unit 83 that shows the status of a registration process. When an operation for starting the registration mode is performed, the registration tool 8 prompts the user to input the quantity of the electronic keys 2 that are to be registered. The registration tool 8 then transmits a registration signal, together with the input quantity, to the immobilizer ECU 6 of the vehicle 1. In response to the registration signal, the immobilizer ECU 6 starts the registration mode.

The immobilizer ECU 6 includes a mode switching unit 61 that switches the operation mode. In response to the registration signal from the registration tool 8, the mode switching unit 61 switches the operation mode to the registration mode. Upon completion of the registration mode (registration of the electronic key 2), the mode switching unit 61 switches the operation mode to a normal mode in which verification (ID verification) of the electronic key 2 is performed, and the normal mode is maintained until a registration signal is received next from the registration tool 8.

The immobilizer ECU 6 includes a key ID write unit 62 that writes a key ID code KID of the electronic key 2 to the memory 69. In the registration mode, the key ID write unit 62 writes the key ID code KID, which is transmitted from the electronic key 2, to the memory 69.

Further, the immobilizer ECU 6 includes a key ID check unit 63 that checks whether or not the key ID code KID stored in the memory 69 conforms to the key ID code KID stored in the electronic key 2. In the registration mode, the key ID check unit 63 transmits a key ID request signal from the coil antenna 5 to the electronic key 2. Further, the key ID check unit 63 acquires the key ID code KID (key ID signal) from the electronic key 2, and checks whether or not the key ID code KID is stored in the memory 69. Further, the key ID check unit 63 transmits a challenge code used for challenge-response verification to the electronic key 2. The key ID check unit 63 stores a response code transmitted from the electronic key 2, and checks whether or not the response code conforms to the response code obtained by the key ID check unit 63 (response code verification).

The immobilizer ECU 6 also includes a SEED read unit 64 that reads a SEED code used to generate the key encryption key K. During the registration mode, the SEED read unit 64 transmits a SEED request signal from the coil antenna 5 to the data center 10 to acquire the SEED code SC (SEED signal) from the data center 10.

The immobilizer ECU 6 includes a SEED generation request unit 65. During the registration mode, when the SEED code SC is not stored in the data center 10 (e.g., when the electronic key 2 is newly registered), the SEED generation request unit 65 transmits a SEED generation request signal to the data center 10 to request for the generation of a SEED code SC from the key encryption key K. In response to the SEED generation request signal, the data center 10 generates the SEED code SC and stores the SEED code SC in the database 9.

The immobilizer ECU 6 includes an encryption key generation unit 66 that generates the key encryption key K. During the registration mode, the encryption key generation unit 66 receives the SEED code SC acquired by the SEED read unit 64 and uses the SEED code SC, the encryption standard AES, and the vehicle encryption key VK to generate the key encryption key K.

The immobilizer ECU 6 includes an encryption key registration unit 67 that registers the key encryption key K and updates the registration flag. During the registration mode, the encryption key registration unit 67 stores the key encryption key K generated by the encryption key generation unit 66 in the memory 69 to register the key encryption key K (i.e., electronic key 2) to the immobilizer ECU 6. Further, when an electronic key 2 is allowed to be additionally registered to the immobilizer ECU 6 (vehicle 1), the encryption key registration unit 67 sets the registration flag to indicate an acceptable state. When an electronic key 2 is not allowed to be additionally registered, the encryption key registration unit 67 sets the registration flag to indicate a non-acceptable state.

The immobilizer ECU 6 includes a database update unit 68 to update the data of the database 9 in the data center 10 based on the key ID code KID and the key encryption key K stored in the memory 69. When a key ID code KID and a key encryption key K are newly acquired, the database update unit 68 transmits a data update signal to the data center 10 and reflects the data of the memory 69 to the data of the database 9.

The immobilizer ECU 6 acquires the vehicle ID code VID from the vehicle 1 in advance. For example, when a certain operation that requests for the vehicle ID is performed on the vehicle 1, the vehicle ID code VID may be illustrated on the display 15 of the vehicle 1 and stored in the memory 69. Alternatively, when immobilizer verification is accomplished after inserting the electronic key 2 into the key cylinder, the vehicle ID code VID may be illustrated on the display 15 and stored in the memory 69.

Figure 3:
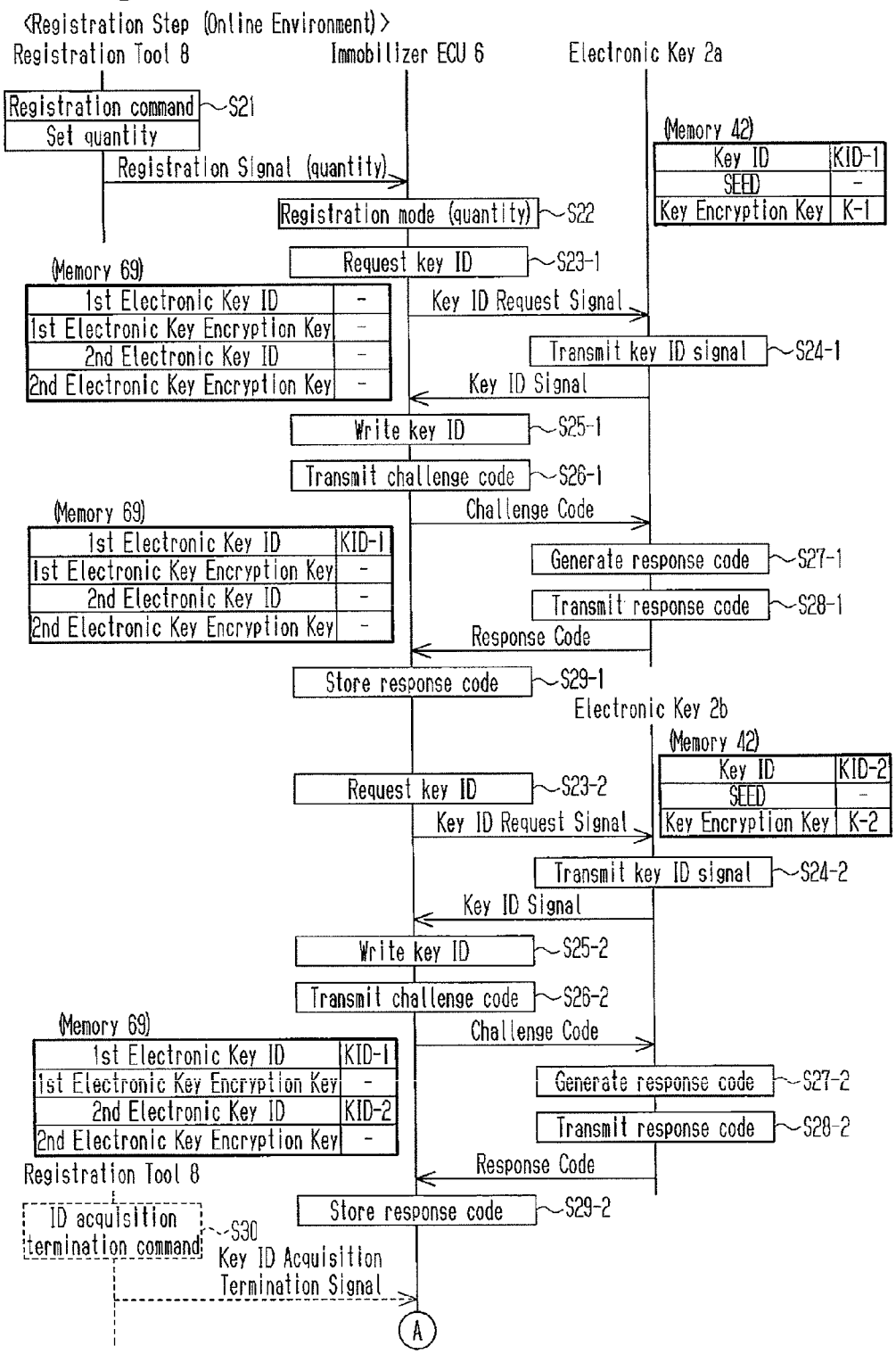
FIGS. 3 and 4 are schematic flow charts illustrating an electronic key registration process in the electronic key registration system of FIG. 1.
Figure 4:
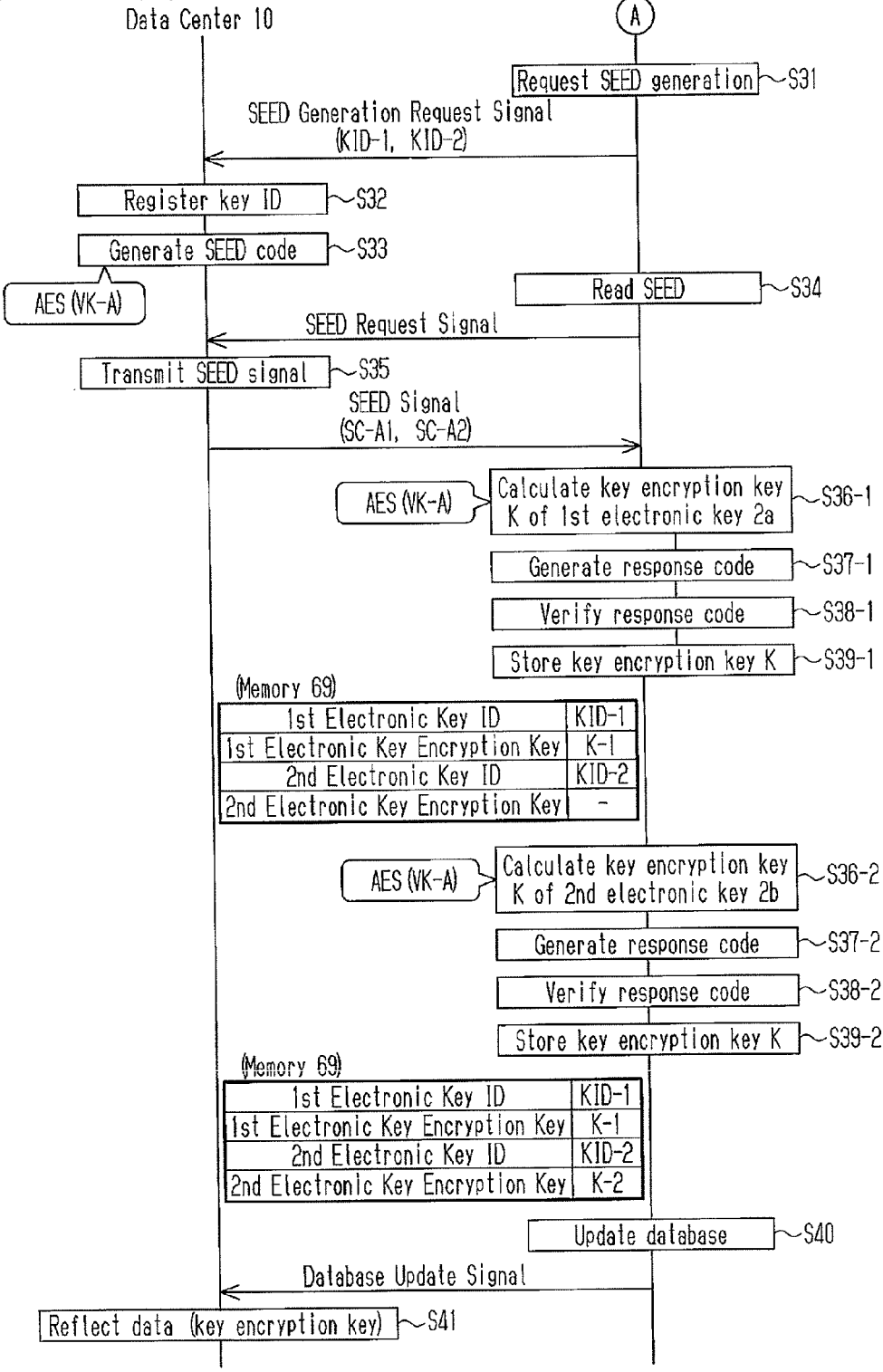

With reference to FIGS. 2 to 4, a registration step of the electronic key 2 under an online environment will now be described. Here, two electronic keys 2, namely, a first electronic key 2a and a second electronic key 2b, are simultaneously registered. In the registration step, the registration tool 8 is connected to the vehicle 1 and to a network 20. This sets the immobilizer ECU 6 under an online environment that allows for communication with the data center 10.

Further, an electronic key manufacturing step is performed in an electronic key manufacturing plant. Referring to FIG. 2, in the electronic key manufacturing step, a key ID code KID-1 and a key encryption key K-1 are stored in the memory 42 of the first electronic key 2a, and a key ID code KID-2 and a key encryption key K-2 are stored in the memory 42 of the second electronic key 2b.

In the electronic key manufacturing step, the key ID codes KID-1 and KID-2 and the key encryption keys K-1 and K-2 of the electronic keys 2a and 2b are stored in the electronic key database 9b of the data center 10. In the electronic key manufacturing step, the key ID codes KID-1 and KID-2 and the key encryption keys K-1 and K-2 of the electronic keys 2a and 2b are not stored in the ECU database 9a of the data center 10.

A controller manufacturing step for manufacturing the immobilizer ECU 6 is performed in parallel to or before or after the electronic key manufacturing step. In the controller manufacturing step, the vehicle ID code VID-A and the vehicle encryption key VK-A of the vehicle 1 are stored in the memory 69 of the immobilizer ECU 6.

Referring to FIG. 2, a registration step of the electronic keys 2a and 2b is performed under an online environment. In the registration step, the immobilizer ECU 6 reads the key ID codes KID-1 and KID-2 from the electronic keys 2a and 2b. Further, the immobilizer ECU 6 transmits a SEED generation request signal to the data center 10 together with the vehicle ID code VID-A and the key ID codes KID-1 and KID-2. In response to the SEED generation request signal, the data center 10 generates SEED codes SC-A1 and SC-A2. When the SEED codes have already been generated in the data center 10, the step of generating the SEED codes may be skipped. Then, the immobilizer ECU 6 acquires the SEED codes SC-A1 and SC-A2 from the data center 10. The immobilizer ECU 6 generates the key encryption keys K-1 and K-2 based on the SEED codes SC-A1 and SC-A2 and stores the key encryption keys K-1 and K-2 in the memory 69. The key ID codes KID-1 and KID-2 acquired from the immobilizer ECU 6 are stored in the ECU database 9a of the data center 10. After the key encryption keys K-1 and K-2 are stored in the immobilizer ECU 6, the key encryption keys K-1 and K-2 of the electronic key database 9b are reflected to the ECU database 9a. The registration step will now be described in detail.

Referring to FIG. 3, when the user operates the operation unit 82 of the registration tool 8 and selects the registration mode, the registration tool 8 transmits a registration signal to the immobilizer ECU 6 (step S21). The registration signal includes the quantity of the electronic keys 2 that are to be registered (in this case, two). In response to the registration signal, the mode switching unit 61 of the immobilizer ECU 6 switches the operation mode to the registration mode (step S22).

Then, the immobilizer ECU 6 sequentially communicates with the electronic keys 2a and 2b to acquire the key ID codes KID-1 and KID-2. The key ID write unit 62 of the immobilizer ECU 6 first transmits a key ID request signal from the coil antenna 5 to the first electronic key 2a (step S23-1).

In response to the key ID request signal, the transponder 4 of the first electronic key 2a transmits a key ID signal from the antenna 21 to the immobilizer ECU 6 (step S24-1). The key ID signal includes the key ID code KID-1 stored in the memory 42 of the first electronic key 2a.

The key ID write unit 62 of the immobilizer ECU 6 acquires the key ID code KID-1 from the key ID signal and writes the key ID code KID-1 to the memory 69 (step S25-1).

Then, the key ID check unit 63 of the immobilizer ECU 6 transmits a challenge code from the coil antenna 5 to the first electronic key 2a (step S26-1). The challenge code is, for example, a random number code.

The transponder 4 of the first electronic key 2a encrypts the challenge code with the key encryption key K-1 to generate a response code (step S27-1). Then, the transponder 4 of the first electronic key 2a transmits the response code from the antenna 21 to the immobilizer ECU 6 (step S28-1).

The ID check unit 63 of the immobilizer ECU 6 stores the response code transmitted from the first electronic key 2a in the memory 69 (step S29-1). At this point of time, the key ID check unit 63 does not have the key encryption key K-1 of the first electronic key 2a but stores the response code in the memory 69 to perform response code verification later.

Subsequently, the key ID write unit 62 of the immobilizer ECU 6 transmits a key ID request signal from the coil antenna 5 to the second electronic key 2b (step S23-2).

In response to the key ID request signal, the transponder 4 of the second electronic key 2b transmits a key ID signal from the antenna 21 to the immobilizer ECU 6 (step S24-2). The key ID signal includes the key ID code KID-2 stored in the memory 42 of the second electronic key 2b.

The key ID write unit 62 of the immobilizer ECU 6 acquires the key ID code KID-2 from the key ID signal and writes the key ID code KID-2 to the memory 69 (step S25-2).

Then, the key ID check unit 63 of the immobilizer ECU 6 transmits a challenge code from the coil antenna 5 to the second electronic key 2b (step S26-2). The challenge code is, for example, a random number code.

The transponder 4 of the second electronic key 2b encrypts the challenge code with the key encryption key K-2 to generate a response code (step S27-2). Then, the transponder 4 of the second electronic key 2b transmits the response code from the antenna 21 to the immobilizer ECU 6 (step S28-2).

The ID check unit 63 of the immobilizer ECU 6 stores the response code transmitted from the second electronic key 2b in the memory 69 (step S29-2). At this point of time, the key ID check unit 63 does not have the key encryption key K-2 of the second electronic key 2b but stores the response code in the memory 69 to perform response code verification later.

In this manner, the immobilizer ECU 6 sequentially communicates with the first and second electronic keys 2a and 2b to acquire the key ID codes KID-1 and KID-2 of the electronic keys 2a and 2b and the respective response codes.

Then, as illustrated in FIG. 4, the SEED generation request unit 65 of the immobilizer ECU 6 transmits the SEED generation request signal to the data center 10 (step S31). The SEED generation request signal includes the vehicle ID code VID-A, which is used to identify the vehicle 1, and the key ID codes KID-1 and KID-2 of the electronic keys 2a and 2b. The immobilizer ECU 6 transmits the key ID codes KID-1 and KID-2 together for the electronic keys 2a and 2b that are the subjects of registration.

When the data center 10 receives the SEED generation request signal, the data center 10 stores the key ID codes KID-1 and KID-2 of the electronic keys 2a and 2b in the ECU database 9a (step S32). Then, the data center 10 generates the SEED code SC-A1 corresponding to the electronic key 2a and the SEED code SC-A2 corresponding to the electronic key 2b (step S33). In this case, the data center 10 uses the encryption standard AES, the key encryption keys K-1 and K-2, and the vehicle encryption key VK-A to generate the SEED codes SC-A1 and SC-A2. When the SEED codes SC- A1 and SC-A2 have already been stored in the data center 10, steps S31 to S33 may be skipped.

The SEED read unit 64 of the immobilizer ECU 6 then transmits the SEED request signal to the data center 10 (step S34).

In response to the SEED request signal, the data center 10 transmits a SEED signal, which includes the SEED codes SC-A1 and SC-A2, to the immobilizer ECU 6 (step S35). Accordingly, the immobilizer ECU 6 receives the SEED codes SC-A1 and SC-A2 of the electronic keys 2a and 2b, which are the registration subjects, together from the data center 10.

When receiving the SEED signal, the immobilizer ECU 6 calculates the key encryption keys K-1 and K-2 and sequentially verifies the response codes of the electronic keys 2a and 2b. The encryption key generation unit 66 of the immobilizer ECU 6 first calculates the key encryption key K-1 of the first electronic key 2a based on the encryption standard AES, the SEED code SC-A1 acquired by the SEED read unit 64, and the vehicle encryption key VK-A (step S36-1). That is, the immobilizer ECU 6 does not directly acquire the key encryption key K-1 from the data center 10. Rather, the immobilizer ECU 6 acquires the SEED code SC-A1 to generate the key encryption key K-1.

Then, the key ID check unit 63 of the immobilizer ECU 6 uses the key encryption key K-1 to encrypt the challenge code, which was transmitted to the first electronic key 2a in advance, to generate a response code (step S37-1). Further, the key ID check unit 63 of the immobilizer ECU 6 verifies the response code with the response core, which was transmitted in advance from the first electronic key 2a and stored in the memory 69 (step S38-1).

When the response code verification is accomplished, the encryption key registration unit 67 of the immobilizer ECU 6 stores the key encryption key K-1 generated by the encryption key generation unit 66 in the memory 69 (step S39-1). As a result, the key encryption key K-1, that is, the first electronic key 2a, is registered to the immobilizer ECU 6. This allows for ID verification (immobilizer verification) of the first electronic key 2a to be performed with the key encryption key K-1 through encrypted communication between the immobilizer ECU 6 and the first electronic key 2a.

Then, the encryption key generation unit 66 of the immobilizer ECU 6 calculates the key encryption key K-2 of the second electronic key 2b based on the encryption standard AES, the SEED code SC-A2 acquired by the SEED read unit 64, and the vehicle encryption key VK-A (step S36-2). That is, the immobilizer ECU 6 does not directly acquire the key encryption key K-2 from the data center 10. Rather, the immobilizer ECU 6 acquires the SEED code SC-A2 to generate the key encryption key K-2.

Then, the key ID check unit 63 of the immobilizer ECU 6 uses the key encryption key K-2 to encrypt the challenge code, which was transmitted to the second electronic key 2b in advance, to generate a response code (step S37-2). Further, the key ID check unit 63 of the immobilizer ECU 6 verifies the response code with the response core, which was transmitted in advance from the second electronic key 2b and stored in the memory 69 (step S38-2).

When the response code verification is accomplished, the encryption key registration unit 67 of the immobilizer ECU 6 stores the key encryption key K-2 generated by the encryption key generation unit 66 in the memory 69 (step S39-2). As a result, the key encryption key K-2, that is, the second electronic key 2b, is registered to the immobilizer ECU 6. This allows for ID verification (immobilizer verification) of the second electronic key 2a to be performed with the key encryption key K-2 through encrypted communication between the immobilizer ECU 6 and the second electronic key 2b.

Subsequently, the database update unit 68 of the immobilizer ECU 6 transmits the database update signal to the data center 10 (step S40). In response to the update signal, the data center 10 updates the data of the ECU database 9a based on the data of the electronic key database 9b (step S41). As a result, the key encryption keys K-1 and K-2 are stored in the ECU database 9a.

As described above, when registering the electronic keys 2a and 2b, the immobilizer ECU 6 transmits the key ID codes KID-1 and KID-2 of the electronic keys 2a and 2b together to the data center 10 and receives the SEED codes SC-A1 and SC-A2 corresponding to the electronic keys 2a and 2b together from the data center 10. Thus, there is no need for the number of times communication is performed to be the same as the quantity of the electronic keys 2 that are subject to registration. Accordingly, the registration process of a plurality of electronic keys 2 is facilitated. Further, when the immobilizer ECU 6 acquires the key ID codes KID-1 and KID-2 of the electronic keys 2a and 2b, the immobilizer ECU 6 also acquires the response codes of the electronic keys 2a and 2b used for the challenge-response verification. Thus, after generating the key ID codes KID-1 and KID-2, the immobilizer ECU 6 performs response code verification without performing communication again with the electronic keys 2a and 2b. As a result, the time for registering the electronic keys 2a and 2b may be reduced.

In the present embodiment, the immobilizer ECU 6 includes a memory (RAM or the like) that stores commands executed by the immobilizer ECU 6. The commands are configured to have the immobilizer ECU 6 acquire the key ID code KID-1 from the first electronic key 2a, acquire the key ID code KID-2 from the second electronic key 2b, transmit the vehicle ID code VID together with both of the key ID codes KID-1 and KID2 to the data center 10, acquire the SEED code SC-A1 corresponding to the first electronic key 2a together with the SEED code SC-A2 corresponding to the second electronic key 2b from the data center 10, generate the key encryption key K-1 based on the SEED code SC-A1, and generate the key encryption key K-2 based on the SEED code SC-A2.

Further, the commands stored in the memory are configured to have the immobilizer ECU 6 transmit a challenge code to the first electronic key 2a after acquiring the key ID code KID-1 from the first electronic key 2a, receive from the first electronic key 2a a first response code generated by the first electronic key 2a based on the key encryption key K-1 and the challenge code, transmit the challenge code to the second electronic key 2b after acquiring the key ID code KID-2 from the second electronic key 2b, receive from the second electronic key 2b a second response code generated by the second electronic key 2b based on the key encryption key K-2 and the challenge code, generate a third response code based on the key encryption key K-1 and the challenge code after generating the key encryption key K-1 based on the SEED code SC-A1, generate a fourth response code based on the key encryption key K-2 and the challenge code after generating the key encryption key K-1 based on the SEED code SC-A2, verify the first electronic key 2a by comparing the first response code with the third response code, and verify the second electronic key 2b by comparing the second response code with the fourth response code.

The above embodiment has the advantages described below.

(1) The key ID code KID and the key encryption key K of the electronic key 2 are registered in advance to the data center 10. The data center 10 generates the SEED code SC from the key encryption key K, and the immobilizer ECU 6 generates the key encryption key K from the SEED code SC. Thus, only the electronic key 2 that has the key ID code KID and the key encryption key K, which are registered in advance to the data center 10, and that is capable of communicating with the data center 10 through the immobilizer ECU 6 is registered to the immobilizer ECU 6. This maintains a certain level of security. Further, the immobilizer ECU 6 transmits the key ID codes KID-1 and KID-2 of the electronic keys 2a and 2b together to the data center 10. The immobilizer ECU 6 also acquires the SEED codes SC-A1 and SC-A2, which are generated from the key encryption key K-1 and K-2, together from the data center 10. In this manner, when transmitting and receiving the key ID codes KID and the SEED codes, communication between the immobilizer ECU 6 and the data center 10 does not have to be performed for a number of times that is the same as the quantity of the electronic keys 2 to be registered. This facilitates the process for registering a plurality of electronic keys 2, while maintaining a certain level of security.

(2) When acquiring the key ID codes KID-1 and KID-2 of the electronic keys 2a and 2b, the immobilizer ECU 6 also acquires the response codes of the electronic keys 2a and 2b that are used for challenge-response verification. Thus, after the key encryption keys K-1 and K-2 are generated, the immobilizer ECU 6 performs response code verification without communicating again with the electronic keys 2a and 2b. As a result, while maintaining a certain level of security, the time used for the registration process of the electronic keys 2a and 2b may be reduced.

(3) When the registration tool 8 switches the operation mode of the immobilizer ECU 6 to the registration mode, the quantity of the electronic keys 2 that are to be registered is set. Thus, the immobilizer ECU 6 recognizes the quantity of the electronic keys 2 that are registered. This allows for the immobilizer ECU 6 to terminate the registration process once the electronic keys 2 are all registered and proceed to the next process. Thus, the registration process may be smoothly performed.

It should be apparent to those skilled in the art that the present invention may be embodied in many other specific forms without departing from the spirit or scope of the invention. Particularly, it should be understood that the present invention may be embodied in the following forms.

In the above embodiment, when the registration tool 8 switches the operation mode to the registration mode, the quantity of the electronic keys 2 that are to be registered is set. However, the quantity of the electronic keys 2 does not have to be designated in advance. For example, referring to FIG. 3, step S30, which is illustrated by broken lines in FIG. 3, may be added. In step S30, when the immobilizer ECU 6 obtains the key ID codes KID of all of the electronic keys 2 that are to be registered, the registration tool 8 transmits an acquisition termination command (key ID acquisition termination signal) to the immobilizer ECU 6. In response to the termination signal, the immobilizer ECU 6 terminates the acquisition of the key ID codes KID and may then proceed to step S31.

In the above embodiment, after the immobilizer ECU 6 acquires the key ID code KID, the response code of the electronic key 2 is generated. However, the response code of the electronic key 2 may be generated after the immobilizer ECU 6 calculates the key encryption key K from the SEED code SC.

In the above embodiment, the encryption standard AES is used to generate the SEED code SC and the key encryption key K. However, a different encryption standard or encryption specification may be used.

In the above embodiment, the data center 10 may verify the user (person performing registration) before executing a registration command in the registration step that is performed under an online environment. For example, an ID code and password of the person performing the registration may be used to perform user verification.

In the above embodiment, the registration tool 8 may be a versatile computer, such as a personal computer or a smartphone, incorporating software used exclusively for registration.

In the above embodiment, the encryption key is registered after the challenge-response verification is performed. However, as long as a certain level of security may be obtained, the challenge-response verification may be omitted.

In the above embodiment, when acquiring the vehicle ID code VID, the vehicle ID code VID is illustrated on the display 15 of the vehicle 1. Instead, a certain operation requesting for the vehicle ID code VID may be performed so that the vehicle 1 sends a mail to an address designated by the user. In this case, only the user that receives the mail can check the vehicle ID code VID. Thus, a high level of confidentiality may be obtained.

The above embodiment is applied to the immobilizer system 3 in which the electronic key 2 is inserted into the key cylinder. However, the electronic key system may be configured so that communication is performed between the electronic key 2 and the vehicle 1 (controller) when the electronic key 2 enters a communication area formed by the vehicle 1.

In the above embodiment, the electronic key system is applied to the vehicle 1 but may be applied to a building such as a house.

The present examples and embodiments are to be considered as illustrative and not restrictive, and the invention is not to be limited to the details given herein, but may be modified within the scope and equivalence of the appended claims.

The invention claimed is:

1. An electronic key registration method for registering a plurality of electronic keys to a controller of a communication subject through communication with a data center, wherein the electronic keys are capable of communicating with the controller, the electronic key registration method comprising:
    storing communication subject identification information and a communication subject encryption key, which are unique to the communication subject, in the controller;
    storing the communication subject identification information and the communication subject encryption key in the data center;
    storing first key identification information and a first key encryption key, which are unique to a first electronic key, in the first electronic key;
    storing second key identification information and a second key encryption key, which are unique to a second electronic key, in the second electronic key;
    storing the first and second key identification information and the first and second key encryption keys in the data center;
    acquiring the first key identification information from the first electronic key with the controller;
    acquiring the second key identification information from the second electronic key with the controller;
    transmitting both of the first and second key identification information together with the communication subject identification information from the controller to the data center;

generating a first encryption key generation code with the data center, wherein the first encryption key generation code is based on the communication subject encryption key and the first key encryption key;

generating a second encryption key generation code with the data center, wherein the second encryption key generation code is based on the communication subject encryption key and the second key encryption key;

obtaining both of the first and second encryption key generation codes from the data center with the controller;

generating the first key encryption key based on the first encryption key generation code with the controller;

generating the second key encryption key based on the second encryption key generation code with the controller; and storing the first and second key encryption keys in the controller.

2. The electronic key registration method according to claim 1, further comprising:

transmitting a challenge code used for challenge-response verification to the first electronic key from the controller after the acquiring the first key identification information from the first electronic key;

transmitting a first response code to the controller from the first electronic key, wherein the first response code is generated based on the first key encryption key and the challenge code by the first electronic key;

transmitting the challenge code to the second electronic key from the controller after the acquiring the second key identification information from the second electronic key;

transmitting a second response code to the controller from the second electronic key, wherein the second response code is generated based on the second key encryption key and the challenge code by the second electronic key;

generating a third response code based on the first key encryption key and the challenge code with the controller after the generating the first key encryption key with the controller;

generating a fourth response code based on the second key encryption key and the challenge code with the controller after the generating the second key encryption key with the controller;

verifying the first electronic key by comparing the first response code with the third response code; and verifying the second electronic key by comparing the second response code with the fourth response code.

3. The electronic key registration method according to claim 1, further comprising:

switching an operation mode of the controller to a registration mode with a registration tool; and setting the quantity of registered electronic keys with the registration tool when switching to the registration mode.

4. An electronic key registration system comprising:

a plurality of electronic keys including first and second electronic keys, wherein the first electronic key has first key identification information and a first key encryption key which are unique to the first electronic key, and the second electronic key has second key identification information and a second key encryption key which are unique to the second electronic key;

a controller arranged in a communication subject, wherein the controller is capable of communicating with the electronic keys and has communication subject identification information and a communication subject encryption key which are unique to the communication subject; and a data center, wherein the communication subject identification information, the communication subject encryption key, the first and second key identification information, and the first and second key encryption keys are stored in the data center, wherein the controller includes a memory that stores commands executed by the controller and configured to have the controller:

acquire the first key identification information from the first electronic key, acquire the second key identification information from the second electronic key, transmit both of the first and second key identification information together with the communication subject identification information to the data center so that the data center generates a first encryption key generation code based on the communication subject encryption key and the first key encryption key and generates a second encryption key generation code based on the communication subject encryption key and the second key encryption key, acquire the first encryption key generation code corresponding to the first electronic key together with the second encryption key generation code corresponding to the second electronic key from the data center, generate the first key encryption key based on the first encryption key generation code, generate the second key encryption key based on the second encryption key generation code, and store the first and second key encryption keys in the controller.

5. A controller arranged in a communication subject, wherein the controller is capable of communicating with a data center and a plurality of electronic keys including a first electronic key and a second electronic key, the controller comprising:

a memory that stores commands executed by the controller and configured to have the controller:

acquire first key identification information from the first electronic key, acquire second key identification information from the second electronic key, transmit both of the first identification information and the second key identification information together with communication subject identification information to the data center so that the data center generates a first encryption key generation code based on the communication subject encryption key and a first key encryption key and generates a second encryption key generation code based on the communication subject encryption key and a second key encryption key, acquire a first encryption key generation code corresponding to the first electronic key together with a second encryption key generation code corresponding to the second electronic key from the data center, generate the first key encryption key based on the first encryption key generation code, generate the second key encryption key based on the second encryption key generation code, and store the first key encryption key and the second key encryption key in the controller, wherein the first electronic key has the first key identification information and the first key encryption key which are unique to the first electronic key, wherein the second electronic key has the second key identification information and the second key encryption key which are unique to the second electronic key, wherein the controller has the communication subject identification information and a communication subject encryption key which are unique to the communication subject, and wherein the data center has the communication subject identification information, the communication subject encryption key, the first key identification information and second key identification information, and the first key encryption key and second key encryption key.

* * * * *